United States Patent [19]
Volz

[11] Patent Number: 5,152,587
[45] Date of Patent: Oct. 6, 1992

[54] HYDRAULIC SLIP-CONTROLLED BRAKE SYSTEM WITH PNEUMATIC POWER BOOSTER

[75] Inventor: Peter Volz, Darmstadt, Fed. Rep. of Germany

[73] Assignee: Alfred Teves GmbH, Frankfurt am Main, Fed. Rep. of Germany

[21] Appl. No.: 536,608
[22] PCT Filed: Nov. 1, 1990
[86] PCT No.: PCT/EP89/01307
§ 371 Date: Jun. 29, 1990
§ 102(e) Date: Jun. 29, 1990
[87] PCT Pub. No.: WO90/05081
PCT Pub. Date: May 17, 1990

[30] Foreign Application Priority Data
Nov. 3, 1988 [DE] Fed. Rep. of Germany ....... 3837314
Mar. 2, 1989 [DE] Fed. Rep. of Germany ....... 3906529

[51] Int. Cl.⁵ .................... B60T 8/44; B60T 13/569
[52] U.S. Cl. ................... 303/114 PN; 303/12; 303/113 TB; 303/115 VM; 91/369.3
[58] Field of Search ............. 303/114 PN, 113 R, 10, 303/12, 113 TB, 114 R, 114 PB, 113 TR, 115 VM; 60/547.1; 91/369.3; 180/197

[56] References Cited
U.S. PATENT DOCUMENTS

| | | |
|---|---|---|
| 3,556,608 | 1/1971 | MacDuff et al. ............ 303/114 PN |
| 4,173,172 | 11/1979 | Ohmi ................................ 91/369.3 |
| 4,630,706 | 12/1986 | Takayama et al. .......... 303/114 PN |
| 4,708,401 | 11/1987 | Klein ........................... 303/115 VM |
| 4,828,332 | 5/1989 | Lohberg ....................... 303/9.61 X |
| 4,828,337 | 5/1989 | Wagner et al. ............. 303/114 PN |
| 4,838,619 | 6/1989 | Ocvirk .......................... 303/114 PN |
| 4,979,426 | 12/1990 | Schiel et al. .................. 303/113 TB |
| 5,031,971 | 7/1991 | Boehm et al. ....................... 303/114 |

FOREIGN PATENT DOCUMENTS

| | | |
|---|---|---|
| 3317629 | 4/1983 | Fed. Rep. of Germany . |
| 3619793 | 1/1987 | Fed. Rep. of Germany ... 303/114 R |
| 134048 | 8/1984 | Japan ............................. 303/114 PN |
| 2186335 | 8/1987 | United Kingdom ........... 303/114 R |
| 2217800 | 11/1989 | United Kingdom ......... 303/114 PN |

Primary Examiner—Robert J. Oberleitner
Assistant Examiner—Alfred Muratori
Attorney, Agent, or Firm—Robert P. Seitter; J. Gordon Lewis

[57] ABSTRACT

A brake system is provided which includes a restoring unit by which a restoring force can be applied to the pedal. Since the pedal, at the same time, actuates a control valve 9 determining the booster force, during a restoring operation, the booster force also is reduced. The wall 40 accepting the restoring forces advantageously can be located in the booster housing 5 between the master cylinder 1 and the booster wall 6. Since the wall 40 covers relatively small distances only relative to the booster wall 6, the overall length of the booster housing 5 is not significantly increased.

9 Claims, 4 Drawing Sheets

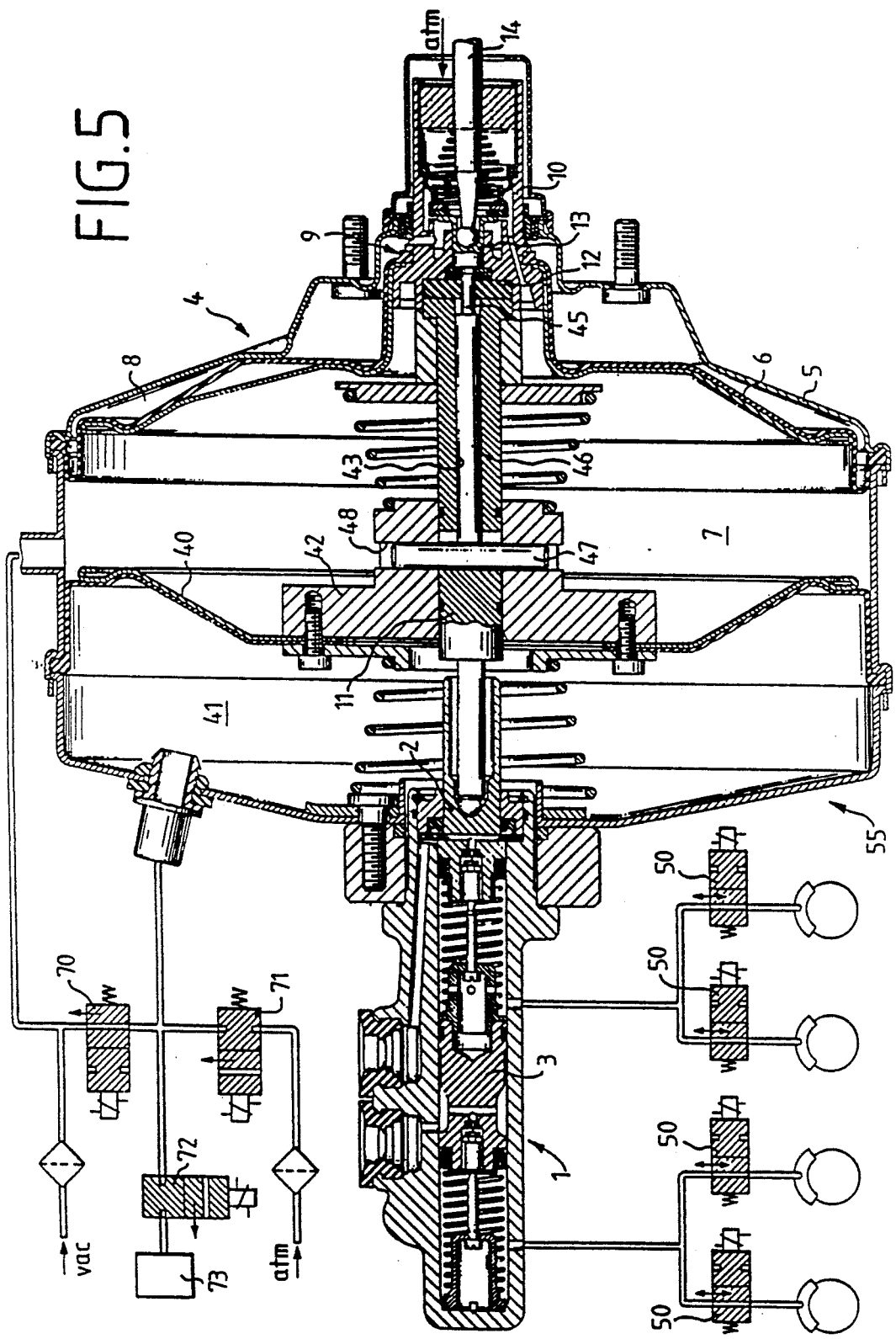

HYDRAULIC SLIP-CONTROLLED BRAKE SYSTEM WITH PNEUMATIC POWER BOOSTER

BACKGROUND OF THE INVENTION

The present invention relates to a brake system of the type including a master cylinder connected to wheel brakes and a booster which includes a movable booster wall and, more particularly, to such a system including a restoring arrangement coupled to a pedal.

A brake system of this general type has been described, for example, in German patent document DE-OS 33 17 629. The system substantially comprises a master cylinder and a booster boosting the pedal force acting upon the master cylinder. The wheel brakes, respectively through electromagnetically operated valves, are in communication with the master cylinder. Each respectively connected valve, in its initial position, is opened such that a pressure fluid communication is established between the master cylinder and the wheel brake cylinders. The rotating pattern of the wheels is permanently monitored, thereby immediately detecting once a wheel tends to lock during deceleration. In the event of a locking tendency, the brake pressure in the master brake cylinder is caused to drop, at the same time the valves of the wheels not tending to lock are switched to the blocking position so that it is only the wheel brake cylinder of the wheel tending to lock to which a reduced pressure is applied. The pressure decrease in the master brake cylinder is effected by re-switching the booster. Reswitching means that the chamber of the brake force booster previously in communication with a high pressure source for enhancing the pedal force, will be connected to a low pressure source whereas the chamber previously connected to the low pressure source, therefore will be in communication with the high pressure source. This will result in a relief of the master brake cylinder and, hence, in a pressure drop in the brake circuits as the pedal forces are compensated rather than enhanced.

As described in GB-PS 15 11 254, the problem is that the driving end and, hence, the restoring forces are determined by the effective surface of the booster and by the pressure difference between high pressure source and low pressure source which typically are of a configuration such that in case of a maximum output, that is at the highest possible pressure difference on the booster wall, a pressure is developed in the master brake cylinder that results in wheel locking. Increasing the pressure in the master brake cylinder, in that case, would not result in a further increase in the deceleration of the vehicle thus support of the pedal force beyond the point of maximum boosting is not required.

However, this type of relief of the master brake cylinder may require compensation of those pedal forces that exceed the boosting forces attained at the point of maximum boosting. The restoring forces of the booster are thus required to substantially exceed the supporting forces. While the supporting forces can be adjusted to the locking pressure, the restoring forces must be adapted to the pedal forces the driver is able to apply. Once the pedal forces exceed the restoring forces, the pressure is not adequately decreased in the master brake cylinder thereby precluding a brake slip control. This problem, according to the noted British Patent, is solved in that a second diaphragm plate is provided on the control sleeve of the brake valve so that during brake slip control, for restoring, the effective booster surface is enlarged. The disadvantages is that corresponding space of movement must be provided for the second diaphragm plate resulting in substantial structural space requirements. Moreover, additional valves are required enabling a corresponding amount of pressure fluid to flow into the chambers confined by the second diaphragm plate.

An object of the invention is, therefore, to provide a brake force booster providing adequate restoring forces while requiring simple valve measures and, at the same time, minimal requirements in terms of structural dimensions.

SUMMARY OF THE INVENTION

This problem is solved by coupling a restoring wall to the pedal piston to the pedal-remote side of which pressure is applied that develops in accordance with the rotating pattern of the wheels to be decelerated.

Briefly, in accordance with the present invention, the restoring forces act upon the pedal piston directly. This has the advantage that, for brake slip control, it is only the pressure fluid supply to the chamber confined by the pedal-remote side of the restoring wall that requires control. Valve requirements are minimal. Once the pedal piston is displaced under the action of the forces acting upon the restoring wall, the brake valve is actuated at the same time, thereby also influencing the pressure difference on the booster wall, with the result that, depending on the degree of compensation of the pedal force, the force boosting also is reduced.

The restoring unit can be provided and readily adapted to operate both on an incompressible fluid, such as brake fluid, and on air forming the pressure fluid. If the pressure medium is air the restoring wall can be arranged between the master brake cylinder and the booster in the booster housing. As the restoring wall is moved with the booster wall, covering only small control distances relative to the booster wall, the structural length of the system remains substantially the same as one of conventional design. The pedal piston, through a shaft, is in communication with the restoring wall, which shaft is guided through the reaction element and a longitudinal channel within the plunger. The connection to the restoring wall is established by a transverse pin introduced into a transverse port of the plunger and connected to a sleeve on the restoring wall.

Since, for example, in deceleration on frozen roads, the pressure in the master cylinder must be drastically reduced, the restoring unit will have to be designed so as to be capable of generating a force corresponding to the maximum force the driver is able to apply. The force that can be generated by the restoring unit depends on the effective surface of the wall which generally is limited for structural reasons. On the other hand, a number of stability criteria must be fulfilled and, on the other hand, the available assembly space for the restoring unit is not excessively large.

Another alternative is to increase the maximum pressure difference on the movable wall. In this respect, in accordance with the present invention, the modulator chamber can be connected through a valve, to a compressor. The compressor generates a pressure that is above the atmospheric pressure, thereby to provide a higher pressure difference on the restoring plate which will ensure complete compensation of the pedal force including extreme cases. At the same time, the effective surface and, hence, the diameter of the restoring plate, can be kept small. In no case is it necessary of the diameter to exceed the booster plate of the vacuum booster.

The compressor may be any one of a number of possible configurations. It is, for example, possible to provide a separate compressor inside the vehicle, that is in the form of a reciprocating engine or flow machine. Also, consideration may be given to integrating existing compressors into the brake system, using, for example, the turbo-compressor for charging the internal combustion engine. Also, the exhaust gases of an internal combustion engine may be utilized and admitted to the modulator chamber, that is using the exhaust gas system as the compressor. In the latter instance, steps can be taken to prevent the gases from entering the modulator chamber, thereby causing only the exhaust gas pressure, through an intermediate piston, to be transferred into the modulator chamber.

According to another embodiment a restoring unit is provided between the pedal and a pedal piston, in which case it is possible to use a control working on an incompressible fluid provided either by a reservoir or through a pump delivering to the restoring chamber.

The afore-described systems readily permit traction slip control, that is applying pressure to the wheel brakes, with no need for the pedal to be actuated. Pressure is applied to the restoring unit only in the direction of actuation. This is particularly easy to accomplish if the pump is actuated by an electronically commutated electro-motor, at the same time employing a pump which is capable of delivering in either direction. In other cases, to be described, the chamber of the restoring unit close to the pedal is connected to the pressure source.

BRIEF DESCRIPTION OF THE DRAWING

The invention will now be described in greater detail in the following detailed description taken in conjunction with the accompanying drawing wherein.

DETAILED DESCRIPTION

Figure 1:
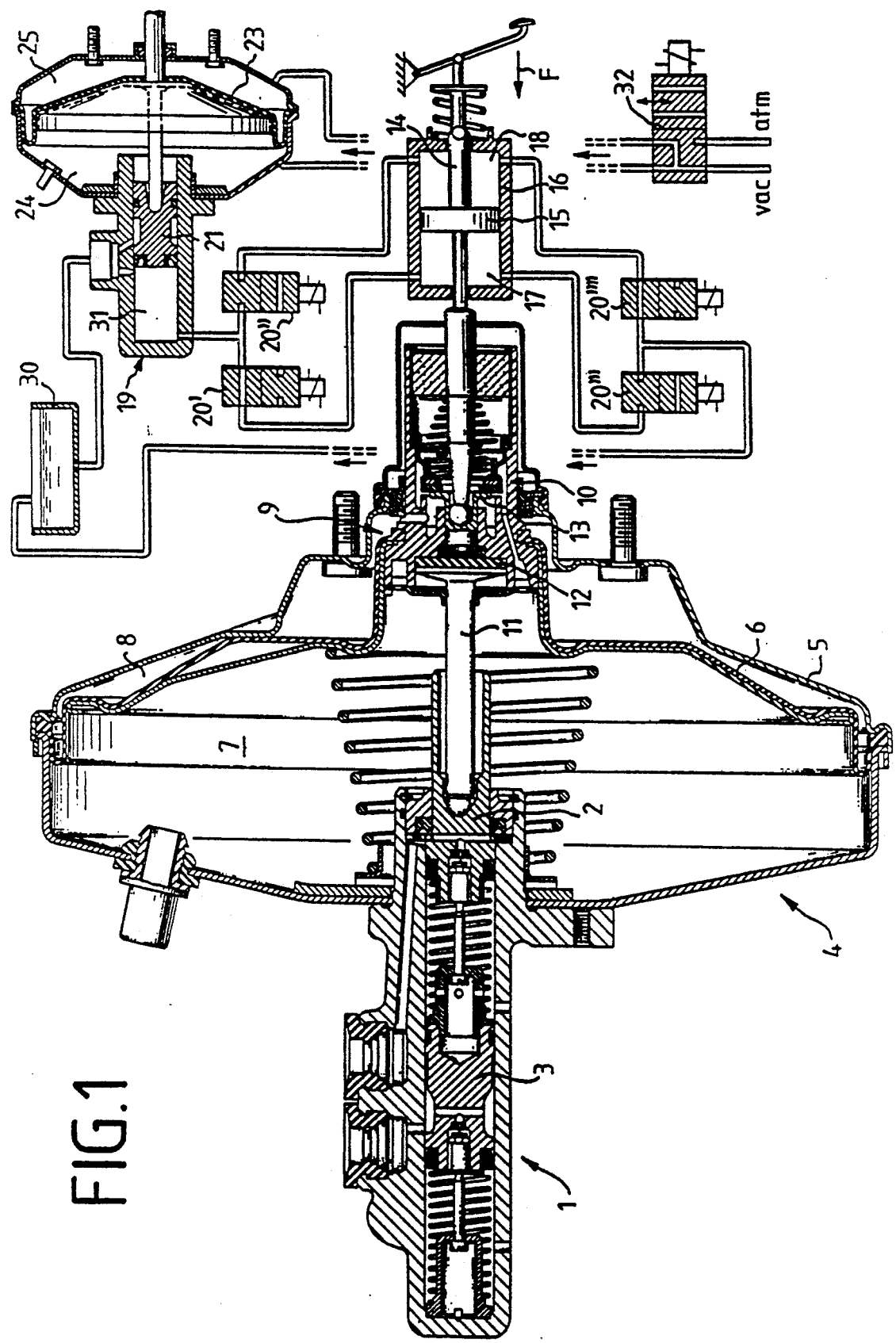
FIG. 1 is a cross-sectional plan view of a hydraulic slip-controlled brake system in accordance with the present invention.

Referring now to FIG. 1, the master cylinder includes two working chambers formed by the push rod piston 2 and the floating piston 3, respectively. Coupled ahead of the master cylinder is a vacuum brake force booster 4 of the housing 5 which is subdivided by the booster plate 6 into a vacuum chamber 7 and a control chamber 8. The vacuum brake force booster 4, moreover, comprises a control valve 9 located in a control sleeve 10 in communication with the booster plate 6. A plunger 11 is supported on the reaction disc 12 to transfer the pedal and pressure forces on the reaction plate 6 to the push rod piston 2 of the master cylinder 1. The reaction disc is a rubber plate acting as a hydraulic cushion. Also, other types of reaction elements may be provided, such as so-called lever-type systems.

The control valve 9 includes a valve piston 13 integrally formed with the pedal rod 14. The valve piston 13 is supported on the reaction disc 12 as is the booster plate 6. The control valve 9 has two switching positions. In the non-actuated position, a communication is established between the two chambers 7 and 8. By actuating the brake pedal (i.e., upon displacement of the pedal rod 14 in the direction of arrow F), this communication, first, is interrupted; and, subsequently, a communication of the control chamber 8 with the atmosphere is established. The air flowing into the control chamber 8 forces the booster plate 6 to the front, actuating the master brake cylinder 1. Switched between the symbolically shown brake pedal and the control valve 9 is the restoring unit comprising a restoring piston 15 fixed to the pedal rod 14, and subdividing the housing 16 into two chambers 17 and 18. The chambers are filled with an incompressible fluid and are connectable to a reservoir 19. Reservoir 19 is a piston-type reservoir including a piston 21 loaded by the pressure difference between the atmosphere and a vacuum source acting on a wall 23. Through valves 20', 20", either the front chamber 17 or the rear chamber 18 can be connected to the reservoir, according to an alternative, respectively one of the chambers can be connected to the reservoir through valves 20''' and 20''''. According to another alternative (not shown), it is possible for wall 23 to be directly connected to the rod 14 so that the pressure differences between the atmosphere and the vacuum source will become effective on the rod 14 directly with no need for the provision of a hydraulic transmission means.

Reservoir piston 21 confines a reservoir chamber 31 which, in the basic position of the store piston 21, through a breather bore, is in communication with a reservoir 30. Through switch-over of the valve 32, the restoring wall 23 is displaced, thereby causing the piston 21 to sweep the breather bore and a pressure to be built up in the chamber 31.

The operation of the described brake system is as follows: To actuate the brake, the pedal is pressed down to cause control valve 9 to re-switch and allow air to flow into the control chamber 8, thereby displacing the booster plate 6 according to the left as shown in the drawing figure such that the push rod piston 2 is pushed into the master cylinder, where a pressure is built up which is passed to the wheel brakes. The chamber 17 of the restoring unit, through the open valve 20', is in communication with the reservoir chamber 31 still connected to the reservoir; the chamber 18, through the open valve 20'''', also is in communication with the reservoir 30. The piston 15 can, therefore, be reciprocated with almost no force being applied thereto.

The rotating pattern of the wheels, is permanently monitored. Once the monitoring system detects that one of the wheels tends to look, valve 32 is actuated to supply pressure to the wall 23. Pressure fluid is displaced from the store chamber into chamber 17 such that a pressure is built up therein supported on wall 15 and, through rod 14, on the pedal. The pedal force acting on the control valve 9, hence, is reduced, thereby decreasing, at the same time, the pressure within the control chamber 8 as the latter always adjusts itself on the control valve 9 in accordance with the effective force. The pressure in the master brake cylinder also is decreased, which is now passed to the wheel brakes still in communication with the master brake cylinder. For the renewed pressure build-up, the pressure in the accumulator is reduced by exciting the valve 32 such that major portions of the pedal force take effect on the control valve 9, causing a corresponding pressure build-up in the master brake cylinder.

Similarly, a traction slip control also can be realized through the system in accordance with the present invention by providing a small number of additional valves. Once it is detected that the driving forces and torques, respectively, on the wheels exceed those that are transferrable between tire and road, the driving torque will have to be compensated, in part, by a brake force. This is done in that, after valves 20' through 20"" are reswitched, the rearward chamber 18 is connected to reservoir 19 such that a pressure force rather than a pedal force then acts upon the wall 15, thereby actuating the brake valve 9.

Figure 2A:
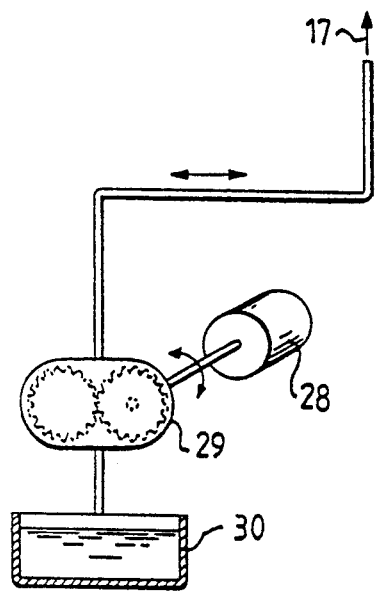
FIGS. 2a and 2b respectively illustrate gear and engine driven pumps which provide alternative forms of pressure sources for use in the brake system of the present invention.
Figure 2B:
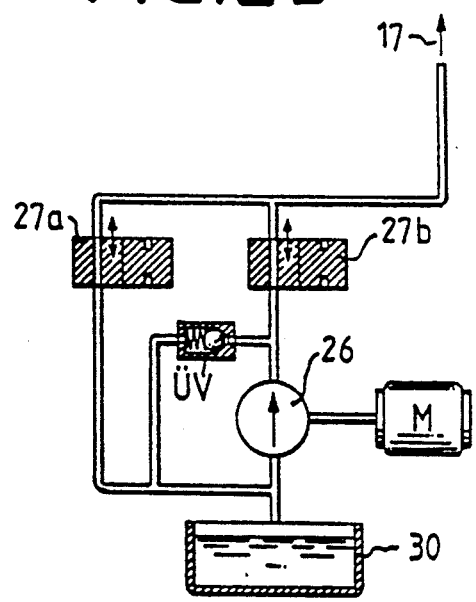

Basically, an engine-driven pump 26 in lieu of reservoir 19, can be connected to chamber 17 (and chamber 18, respectively, in the event of a traction slip control, see FIG. 2b. The pump delivers from the reservoir 30 to an open circuit, and both valves 27a, 27b are opened. By closing valve 27a, additional fluid pressure is supplied to chamber 17, generating a force counter-acting the pedal force. By closing the valve 27b and reopening the valve 27a, the pressure can be re-decreased. The configuration according to the embodiment of FIG. 2a is even simpler. The pump is a gear pump 29 or any other type of pump the delivery direction of which is reversible. The pump 29 is actuated by an electronically commutated engine the rotating direction of which can be rapidly changed, thereby enabling pressure fluid to be easily supplied to or withdrawn from chamber 17.

Figure 3:
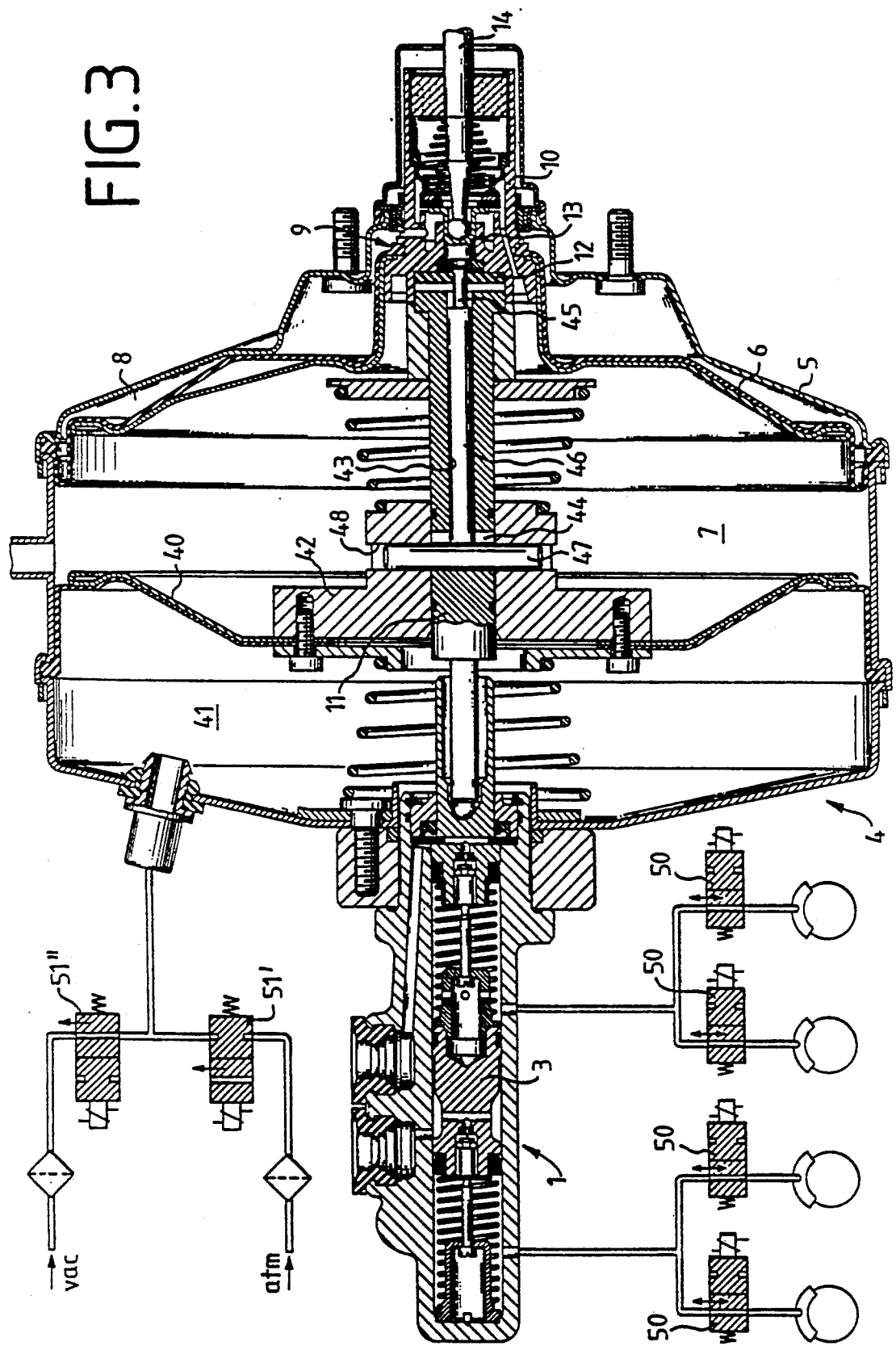
FIG. 3 illustrates a brake system similar to FIG. 1 in which the restoring unit is integrated within the booster housing.

FIG. 3 shows another embodiment according to which the restoring unit is integrated within the booster housing 5. It comprises an additional wall provided by the restoring plate 40 which, in the booster housing 5, separates another chamber 41 connected either to a vacuum source vac or the atmosphere atm. The connection of the restoring plate 40 to the pedal piston 14 is established in the following manner: The restoring plate 40 is connected or screwed to a sleeve 42 sealingly sliding on plunger 11. The sleeve includes a transverse bore 48 plugged into which is a pin 47 passing through the plunger 11 in a transverse bore 44. A longitudinal bore 43 terminates in the transverse bore 44, with a shaft 46 fixed by a connecting piece 45 to the valve piston 13, being guided in the longitudinal bore 43. The connecting piece 45 is passed through the reaction disc, with the shaft 46 being in abutment with pin 47.

The embodiment according the FIG. 3 operates on the following principle. In the basic position, vacuum prevails both in the chambers 7 and 8 and in the chamber 41. Upon actuation of the pedal, the control valve 9 is excited and as previously described, air is admitted to the chamber 8. The in-flowing air forces the booster plate 6 to the left as shown in the drawing. The restoring plate 40 is carried along with no restoring forces taking effect as the pressures on the restoring plate 40 are balanced. For brake slip control purposes, that is, for relieving the master cylinder, air is admitted to chamber 41 by switching over valves 51', 51'', thereby causing a restoring force to act on plate 40, with such force being supported, through pin 47, plunger 43, connecting piece 45, on the valve piston 13 and, hence, on the brake pedal. This will cause valve 9 to be temporarily placed into its basic position such that chambers 7 and 8 are reclosed for a short period of time and the pressure in chamber 8 is lowered. The effect attained, again, is that, by generating a counter-force, the boosting force is at the same time reduced. This configuration also can be easily modified to form a system for traction slip control. For this purpose, chamber 7 is placed in communication with the atmosphere so that air is admitted thereto. The wall 40 is forced to the front, thereby loading the master cylinder. At the same time, valve 9 is actuated such that air flows into chamber 8. The valve will so adjust itself that a pressure equilibrium prevails in chambers 7 and 8 causing the booster wall 6 to be carried along with no force applied.

Figure 4A:
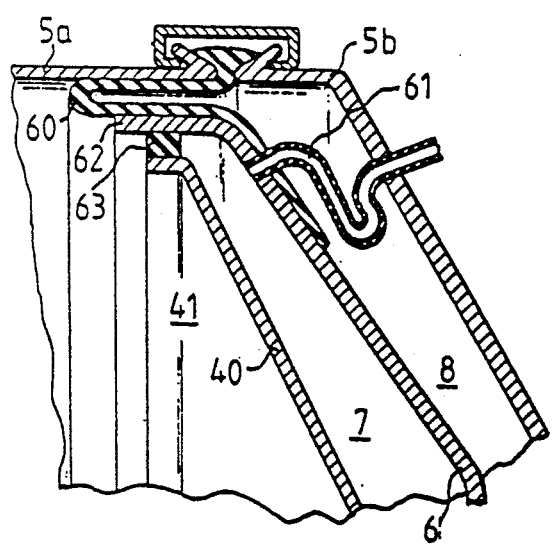
FIGS. 4 and 4b illustrate mounting techniques for the booster and restoring plates; and, FIG. 5 illustrates a brake system similar to FIG. 3 and further including an additional compressor.
Figure 4B:
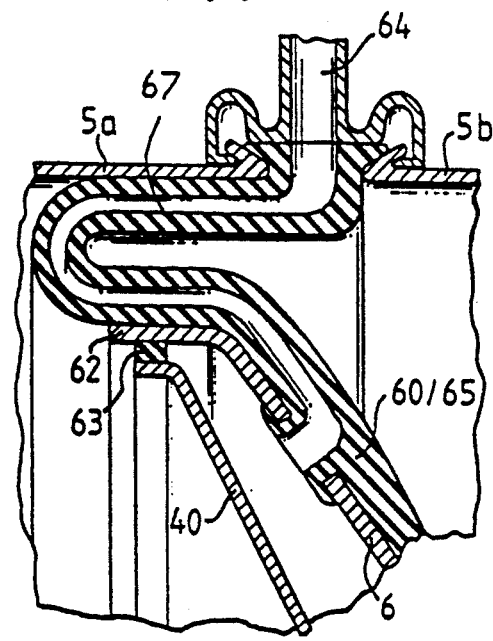

As wall 40 relative to wall 6 covers only a short distance, a modified form of the restoring plate 40', can be guided within a modified form of the booster plate 6'. For this purpose, the booster plate 6', at the outer periphery thereof, is provided with a cylindrically shaped extension in which the restoring plate 40' is sealingly disposed. As only short relative distances are to be covered, there is no need for using a complex rolling diaphragm. A configuration of this type is shown in FIGS. 4a and 4b. The booster plate 6', in the usual manner, is sealingly guided in housing 5 by means of a diaphragm 60. The outer rim of the diaphragm 60 is clamped between the two housing halves 5a and 5b. Plate 6' exhibits a cylindrically shaped extension 62 provided on the outer rim thereof. The inner side of the extension includes a surface in sliding relationship with a sealant 63. The restoring plate 40' now is located within the cylindrically shaped extension 62 and carries a seal 63 on the outer edge thereof. The seal 63 is in abutment with the afore-mentioned inner surface of the cylindrically shaped extension 62. In this manner, a very compact design is ensured. The use of a complex rolling diaphragm sealant for the restoring plate 40' can be eliminated. The vacuum application to chamber 7 is through a hose 61 interconnecting two connections in the booster wall 6 and in the housing portion 5b. This embodiment can be further simplified (FIG. 4b) in that instead of the hose 61 an internal passage 67 is provided, made an integral part of the diaphragm 60'. The vacuum connection 64 leads outwardly between the two housing portions 5a and 5b to the atmosphere. The diaphragm 60' can be a tubular membrane 65.

The construction of the brake system according to FIG. 5 corresponds to the one of the brake system according to FIG. 3 but with an additional compressor 73 connected to the modulation chamber. The restoring unit 55 is arranged as follows: Housing 5, moreover, is provided with a modulator chamber 41 formed on the side of the restoring wall 40 opposite the vacuum chamber 7. The modulator chamber 41, respectively through valves 70, 71, 72, can be connected either to a vacuum source vac, or to the atmosphere atm, or to the compressor 73. The compressor may take any one of a number of configurations. The valve 70 disposed in the connection to the vacuum source, is normally opened such that the modulator chamber 41 as well as the vacuum chamber 7 are non-pressurized. No force is exerted on the restoring wall 40 so that the latter can be carried along, with no force applied, during actuation of the brake.

To generate a restoring force, valve 70 in its communication with the vacuum source is closed and either valve 71 or valve 72 establishing the connections to the atmosphere and to the compressor, respectively, is opened, thereby causing an excess pressure in the modulator chamber 41 to be generated, forcing the restoring wall 40 as shown in the drawing, to the right and loading the pedal piston 14. The force-locking connection between the booster wall 40 and the pedal piston 14 is established as follows: The restoring wall 40 is is fixed to a sleeve 42 sealingly sliding on plunger 11. the plunger includes a transverse bore 48 as well as a longitudinal bore 43. A transverse pin 47 is plugged into the sleeve 42, passing through the transverse bore 48. Disposed in the longitudinal bore 43 is a shaft 46 which, through a connecting piece 45, grips through the reaction disc 12 and is in communication with the valve piston 13. The shaft 46 is in abutment with the transverse pin 47. Once the restoring wall 40 moves to the right, it first moves relative to the plunger 11 as the diameter of the transverse bore 48 exceeds that of the pin 47. The forces acting on the restoring wall 40, through the shaft 46, are transmitted to the valve piston 13 and, hence, to the pedal rod 14. Depending on the force of the restoring force, the pedal force is reduced, thereby subjecting the brake valve 9 to a lower control force. Boosting is reduced by the amount corresponding to the reduced control force, that is, air is withdrawn from the control chamber 8 thereby reducing the force applied to the master cylinder 1. The master cylinder, through brake conduits, is in communication with the wheel brakes. Associated with each wheel brake is a check valve 50 adapted to block the respective brake conduit.

The operation of the brake system is as follows: The brake is activated in that the pedal rod 14 is displaced to the left as shown in FIG. 5. This is effected by means of a pedal (not shown). The brake valve 9 is actuated in the manner as previously described. The air flowing into the control chamber 8 forces the booster wall 6 to the left, actuating the master brake cylinder through the plunger 11. The pressure generated therein, through the brake conduits, is transmitted to the wheel brakes to result in a deceleration of the vehicle.

Once the pressure, in the master brake cylinder, rises excessively, the wheels tend to lock. As soon as associated sensors have detected that a wheel is unduly decelerated and tends to lock, the system actuates the ALS-mode. For this purpose, the valve 70 is closed so that the modulator chamber 41 no longer is connected to the vacuum source, and the valve 71 is opened to the atmosphere. The incoming air displaces the restoring wall to the right and the developing pressure in the modulator chamber 41 compensates the pedal force resulting, as previously described, in a pressure drop in the master brake cylinder 1 and, hence, in the wheel brake of the wheel tending to lock. The valves 50 are associated to the wheels not tending to lock, are closed during this operation so that the pressure drop in the master brake cylinder will have no effect in these wheel brakes.

Even if the full atmospheric pressure prevails in the modulator chamber 41 it is possible that the force exerted on the restoring wall 40 is not adequate to sufficiently compensates the pedal force. In that case, the valve 72 switches to compressor 73 causing air under an excess pressure to flow into the modulator chamber 41 in which an excess pressure prevails rather than the atmospheric pressure, with the excess pressure exceeding the atmospheric pressure and, typically, being sufficient to compensate the pedal force.

By switching the valves 50 and by modulating the pressure in the modulator chamber 41, by opening and closing the valves 71 and 72, an optimum slip value can be adjusted on all wheels such that they transmit high brake forces without tending to lock.

According to an alternative to the two-step application of pressure to the modulator chamber 41 (i.e., firstly, atmospheric pressure and, secondly, excess pressure), under certain conditions, expecially when providing a separate compressore, the atmospheric connection can be eliminated so that in case of a brake slip control, the compressor can be connected directly to the modulator chamber 41.

What is claimed is:

1. An automotive brake system comprising hydraulically operated wheel brakes, a master cylinder including at least one piston displaceable therein for generating hydraulic pressure operating said wheel brakes, hydraulic circuit means interconnecting said master cylinder and said wheel brakes, a brake pedal, a brake pedal rod advanced by said brake pedal operator, means interconnecting said brake pedal rod and said master cylinder to operate said master cylinder with a force applied to said brake pedal rod, said operator means including an operator plunger engaged with said brake pedal rod and said master cylinder piston, booster valve means associated with said brake pedal rod, booster means including a booster housing, a first and a second movable wall extending in said housing to define first, second and third chambers in said booster housing, said first chamber defined between a first portion of said booster housing and said first movable wall, said second chamber defined between said first and second movable walls, and said third chamber defined between said second movable wall and a second portion of said booster housing, means for establishing a vacuum in said first, second, and third chambers, said booster valve means controllably admitting air pressure to said first chamber in response to a force exerted by said brake pedal rod to create a differential pressure between said first and second chambers and across said first movable wall, means creating a fixed connection between said first movable wall and said plunger to apply a booster force to said master cylinder piston by said differential pressure exerted across said first movable wall, means creating a driving connection between said second movable wall and said plunger to be moved together, and means for controllably introducing air pressure into said third chamber to create a differential pressure across said second movable wall exerting a countering force on said plunger opposite said force exerted by said brake pedal rod to reduce said booster force and said brake pedal rod exerted force on said master cylinder piston.

2. The brake system according to claim 1, wherein said means for introducing air pressure into said third chamber includes valve means operable to connect either a vacuum source or atmospheric air pressure into said third chamber.

3. The brake system according to claim 2, further including a source of compressed air and wherein said valve means for introducing air pressure into said third chamber includes means operable to connect said third chamber to a source of vacuum, atmospheric air, or to said source of compressed air.

4. The brake system according to claim 1, wherein said first movable wall is formed with a cylindrical extension and said second movable wall is slidably and sealingly mounted within said first movable wall.

5. The brake system according to claim 4, wherein said means for establishing a vacuum in said second chamber comprises a passage extending through said first movable wall.

6. The brake system according to claim 4, wherein said first movable wall includes a rolling lip diaphragm mounted to said booster housing and wherein said means for establishing a vacuum in said second chamber comprises a passage extending within said rolling lip diaphragm.

7. An automotive brake system comprising hydraulically operated wheel brakes, a master cylinder including at least one piston displaceable therein for generating hydraulic pressure for operating said wheel brakes, hydraulic circuit means interconnecting said master cylinder and said wheel brakes, a brake pedal, a brake pedal rod advanced by said brake pedal operator, means interconnecting said brake pedal rod and said master cylinder to operate said master cylinder with a force applied to said brake pedal rod, said operator means including an operator plunger engaged with said brake pedal rod and said master cylinder piston, booster valve means associated with said brake pedal rod, booster means including a booster housing, a movable wall extending in said housing to define a first and second chamber in said booster housing, means for establishing a vacuum in said second chamber, said booster valve means controllably admitting air pressure to said first chamber in response to a force exerted by said brake pedal rod to create a differential pressure between said first and second chambers and across said first movable wall, means creating a fixed connection between said first movable wall and said plunger to apply a booster force to said master cylinder piston by said differential pressure exerted across said first movable wall, a restoring piston fixed to said brake pedal rod, said restoring piston having one side and another side, a first pressure chamber defined on said one side of said restoring piston away from said master cylinder and a second pressure chamber defined on said another side of said restoring piston adjacent said master cylinder, means for alternatively applying equal pressure in each of said pressure chambers, a greater pressure in said first pressure chamber than in said second pressure chamber, and a greater pressure in said second pressure chamber than in said first pressure chamber, whereby said restoring piston can be neutral, applying a restoring force countering any brake pedal applied force or applying a supporting force acting to operate said master cylinder.

8. The brake system according to claim 7, wherein said means for applying pressure includes pump means having an inlet and outlet and valve means for controllably directing the output of said pump means to one of said first or second pressure chambers and the inlet of said pump means to the other of said first or second pressure chambers.

9. The brake system according to claim 7, wherein said means for applying pressure comprises a reversible pump connected to one of said pressure chambers to apply a positive or negative pressure thereto.

* * * * *